United States Patent [19]
Grant et al.

[11] Patent Number: 5,321,566
[45] Date of Patent: Jun. 14, 1994

[54] MAGNETIC TAPE THREADING AND TRANSPORT APPARATUS INCLUDING A SENSOR FOR CONTROLLING AIR BEARING BLOCK MOVEMENT

[75] Inventors: Frederic F. Grant, Bellflower; Garry Hierman, Alta Dena, both of Calif.

[73] Assignee: Datatape Incorporated, Pasadena, Calif.

[21] Appl. No.: 882,728

[22] Filed: May 14, 1992

[51] Int. Cl.⁵ .................... G11B 5/027; G11B 15/00
[52] U.S. Cl. ............................. 360/85; 360/95; 360/96.2
[58] Field of Search .......... 360/85, 95, 130.22–130.24; 242/182–185; 226/95, 97, 196

[56] References Cited

U.S. PATENT DOCUMENTS

| | | | |
|---|---|---|---|
| 2,866,637 | 12/1958 | Pendleton | 226/95 |
| 3,617,650 | 11/1971 | Morello | 149/100.2 |
| 3,720,794 | 3/1973 | Dolby | 179/100.2 |
| 3,866,855 | 2/1975 | Bryer | 242/184 |
| 3,890,641 | 6/1975 | Mo et al. | 242/185 |
| 3,918,092 | 11/1975 | Rueger | 360/85 |
| 3,940,791 | 2/1976 | Kayan et al. | 360/85 |
| 4,413,293 | 11/1983 | Hathaway | 360/85 |
| 4,456,200 | 6/1984 | Ariniello | 242/185 |
| 4,642,713 | 2/1987 | Ohira et al. | 360/85 |
| 4,763,210 | 8/1988 | Grant | 360/84 |
| 4,772,969 | 9/1988 | Grant | 360/85 |
| 4,779,150 | 10/1988 | Grant | 360/85 |
| 5,003,416 | 3/1991 | Bumb | 360/85 |
| 5,003,424 | 3/1991 | Grant | 360/130.23 |
| 5,164,868 | 11/1992 | Mosher et al. | 360/85 |

OTHER PUBLICATIONS

IBM Technical Disclosure, vol. 12, No. 6, pp. 808–809, Nov. 1969.

Primary Examiner—A. J. Heinz
Assistant Examiner—Brian E. Miller
Attorney, Agent, or Firm—William F. Noval

[57] ABSTRACT

A magnetic tape cassette helical scan magnetic tape recorder has a magnetic tape threading and transport apparatus including multi-surface, multi-radius air bearing blocks for transporting magnetic tape in a helical path around a tilted rotary head scanner. Vacuum walls located on either side of the rotary head scanner assist in threading the magnetic tape from a magnetic tape cassette around the rotary head scanner. The air bearing blocks are moved into position contiguous to the rotary head scanner after the vacuum threading operation is completed. The vacuum walls have longitudinal slots which are substantially coextensive with the extent of the air bearing blocks. A vacuum sensor is positioned at the end of the slots away from the rotary head scanner so that the sensor is only actuated when the tape is against the whole length of the wall. This prevents damage to the tape when the air bearing blocks are moved behind the threaded tape.

2 Claims, 8 Drawing Sheets

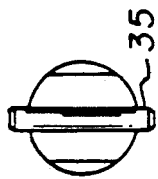
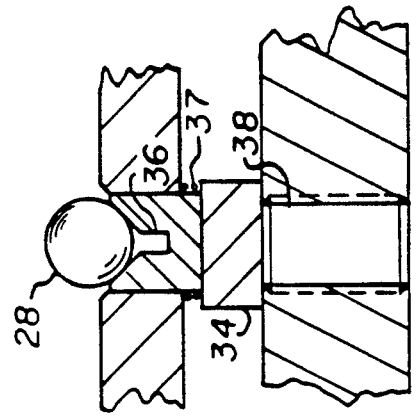
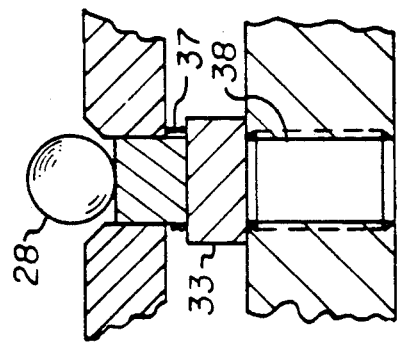
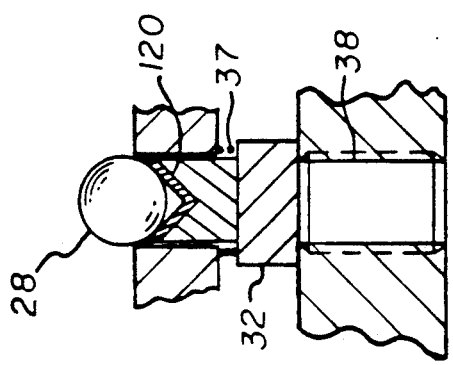
FIG. 3d
FIG. 3c
FIG. 3b
FIG. 3a

MAGNETIC TAPE THREADING AND TRANSPORT APPARATUS INCLUDING A SENSOR FOR CONTROLLING AIR BEARING BLOCK MOVEMENT

FIELD OF INVENTION

This invention relates, in general, to magnetic tape cassette helical scan recorders and relates, more particularly, to apparatus for threading and transporting tape around a rotary head scanner.

DESCRIPTION OF THE PRIOR ART

Helical scan magnetic tape recorders are widely used to record analog or digital information on slant tracks on magnetic tape. Typically, the magnetic tape is contained in a two-reel cassette. The magnetic tape recorder includes a threading mechanism for threading the magnetic tape from the magnetic tape cassette along a transport path past a rotary head scanner. The threading mechanism commonly employed is an elaborate and complicated mechanism, including rollers and pulleys mounted on slides and linkages to extract the magnetic tape from the cassette and to wrap it around the rotary head scanner. Such mechanical threading mechanisms are disadvantageous because they are complex, noisy and subject to breakdown. Typically, the tape transport path around the rotary head scanner includes several magnetic tape guide rollers and bearing surfaces which establish a transport path about the rotary head scanner and other magnetic heads and transport capstans and which can suffer the same disadvantages.

An alternative technique for threading magnetic tape from a magnetic tape cassette is disclosed in commonly assigned F. Grant U.S. Pat. No. 4,763,210, issued Aug. 9, 1988; F. Grant U.S. Pat. No. 4,772,969, issued Sep. 20, 1988; and F. Grant U.S. Pat. No. 4,779,150, issued Oct. 18, 1988. As disclosed in these patents, a magnetic tape threading and guiding apparatus includes a pair of concave air-bearing guides disposed immediately adjacent and tangential to opposite sides of a rotary head scanner to cooperatively form a path for guiding magnetic tape past the head scanner at a predetermined helix angle. A vacuum source serves to evacuate air from the air bearing guides to effect threading of magnetic tape from the magnetic tape cassette. After threading is completed the air bearing guides serve to form an air bearing surface for guiding the tape during recording and reproducing operations. Such a tape threading and guiding apparatus offers several advantages over tape threading and guiding mechanisms of the mechanical type since tape is threaded and guided in a more gentle and less damaging manner, thus providing increased efficiency and minimizing tape damage and destruction of data recorded on the tape.

The following U.S. Patents disclose tape handling devices that are threaded automatically by means of vacuum threading arrangements and that include capstans, guides, or other elements that are retracted out of the tape path during the threading operation, and then returned to operating position; namely, H. Morello U.S. Pat. No. 3,617,650, issued Nov. 2, 1971; D. Dolby U.S. Pat. 3,720,794, issued Mar. 13, 1973; H. Kayan et al. U.S. Pat. No. 3,940,791, issued Feb. 24, 1976; R. Hathaway U.S. Pat. No. 4,413,293, issued Nov. 1, 1983; and T. Ohira et al. U.S. Pat. No. 4,642,713, issued Feb. 10, 1987. The apparatus disclosed in each of these patents is disadvantageous because of the plurality of mechanical elements involved in the threading and transport guiding functions which are subject to maintenance and reliability problems.

In vacuum threading arrangements, it is desirable that the magnetic tape be completely wrapped around the rotary scanner before transport rollers and guides are moved into position behind the magnetic tape and the vacuum is terminated to allow tensioning of the tape around the guides. Several of the above-referenced patents disclose vacuum threading structures having air sensitive switches which are actuated by tape covering the switches. In addition, Ariniello U.S. Pat. No. 4,456,200, issued Jun. 26, 1984, and Bryer, U.S. Pat. No. 3,866,855, issued Feb. 18, 1975, disclose vacuum sensor devices for sensing the extent to which a loop of magnetic tape extends into a vacuum buffer chamber to control tape tension. None of the tape sensing devices disclosed in these patents is entirely suitable for sensing that a whole length of tape is in contact with a vacuum wall so that tape transport guiding elements may be properly inserted behind the tape after the tape has wrapped around a rotary head scanner.

It is thus desirable that a magnetic tape cassette helical scan recorder be provided with a magnetic tape threading and transport apparatus which is an improvement over and solves the problems of known magnetic tape threading and transport arrangements. It is desirable that the magnetic tape threading and transport apparatus, (1) be simple in construction, (2) be maintenance-free, (3) thread the magnetic tape from the magnetic tape cassette in a gentle manner, and (4) transport the threaded magnetic tape in a path, including a helical path about a rotary head scanner, so that no differential stretching of the tape happens due to twisting of the tape and so that tape is guided onto and off of the rotary head scanner in a friction-free manner causing the tape to have uniform stress change in tilt and slope around the scanner.

SUMMARY OF THE INVENTION

According to the present invention, there is provided in a magnetic tape cassette helical scan recorder, new and improved magnetic tape threading and transport apparatus which obviates the disadvantages of known magnetic tape threading and transport arrangements. According to an aspect of the present invention, a magnetic tape cassette helical scan recorder includes a tilted rotary head scanner, means for receiving a magnetic tape cassette spaced from said rotary head scanner, a vacuum enclosure enclosing said rotary head scanner, said vacuum enclosure including a pair of curved vacuum walls respectively located on either side of and contiguous to said rotary head scanner, means for applying vacuum to said vacuum walls to assist in threading magnetic tape from said magnetic tape cassette around said rotary head scanner and into contact with said pair of vacuum walls, and a pair of multi-surface, multi-radius air bearing blocks located on either side of said rotary head scanner and spaced from said vacuum walls. The vacuum walls are provided with a plurality of longitudinal grooves having a cross groove at a tape sensor which is only actuated when the tape is against the whole length of the wall. The air bearing blocks are movable between a first position removed from said enclosure during the tape threading operation and a second tape guiding position spaced from said vacuum walls after tape threading is completed, whereby, when vacuum is terminated to said vacuum walls, said multi-surface, multi-radius air bearing blocks establish a gentle helical transport path about said rotary head scanner. The air bearing blocks are only moved into said second position when the tape sensor is actuated.

BRIEF DESCRIPTION OF THE DRAWINGS

FIGS. 3a, 3b, 3c and 3d are respective elevational, elevational, elevational and plan views of a ball stop positioning assembly for the air bearing blocks of the embodiment of FIG. 1.

DETAILED DESCRIPTION OF THE EMBODIMENTS

Figure 1:
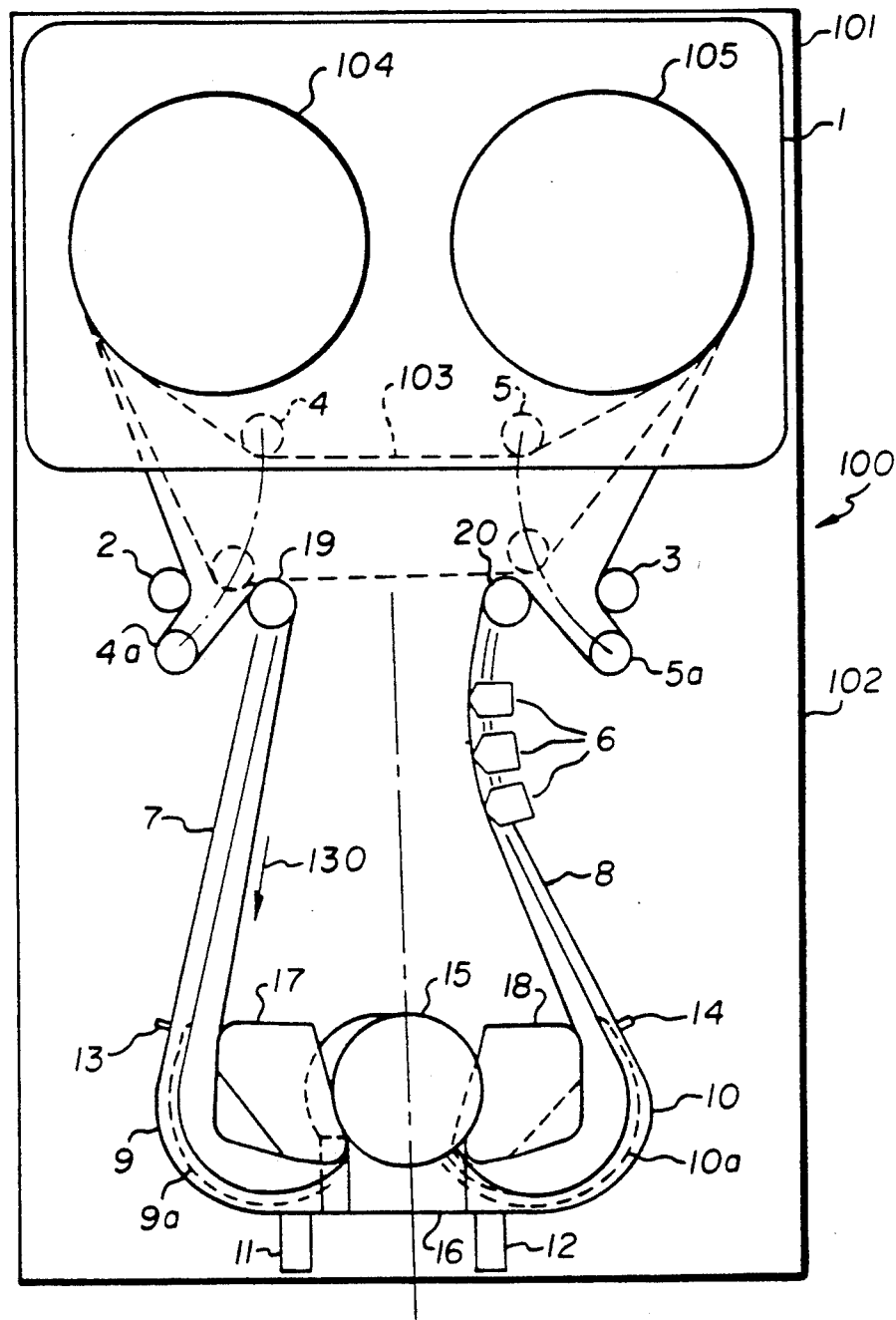
FIG. 1 is a diagrammatic view of a magnetic tape cassette helical scan recorder, including an embodiment of the present invention.

Referring now to the Figures, there is shown a helical scan magnetic tape recorder incorporating an embodiment of the present invention. As shown in FIG. 1, recorder 100 includes a magnetic tape cassette receiving section 101 and magnetic tape transport section 102. Magnetic tape 103 is contained on reels 104 and 105 in a cassette 1. When cassette 1 is received into recorder section 101, the cassette 1 drops down by the usual loading method with the tape 103 in front of the compliance guides 4 and 5 (which may be rollers or air bearings). Guides 4 and 5 are mounted on arms (not shown) which swing them out to positions 4a and 5a (or an intermediate position) for loading the tape 103 so that the tape 103 wraps on fixed position guides 2 and 3 and contacts capstans 19 and 20. The area from capstans 19 and 20 to beyond the rotary head scanner 15 is enclosed by a floor 41 and a cover 40 (FIG. 5) and by walls 7 and 8. Fixed magnetic heads 6 are located along the tape path to scanner 15. A vacuum applied to vacuum outlet pipes 11 and 12 vents the enclosed volume and draws the loop of tape 103 toward and then around the scanner 15. The reel motors for reels 104, 105 are programmed to unspool the tape 103 during this event. The floor 41 and cover 40 are positioned to confine the tape 103 by spacing them apart by a distance which is a little more than the tape 103 width to position the tape 103 onto the scanner 15 the proper distance from its base.

The scanner 15 is tilted by an angle close to or equal to the operating helix angle of the tape 103 on the scanner 15. The curved vacuum walls 9 and 10 have grooves 9a and 10a facing the tape 103 and joined by the vent ports to vacuum outlet pipes 11 and 12 which are located closely to scanner carrier 16. Thus, the air flow to the vacuum draws the tape 103 first around the capstans 19, 20 and then to its helical path on the scanner as defined by its first contact with the scanner 15. The vacuum grooves 9a, 10a then vent the vacuum outward from the scanner ahead of the tape 103 to roll the tape 103 into contact with the vacuum walls 9, 10 much like a carpet unrolls onto a floor.

When the tape 103 has contacted walls 9 and 10 to the end of grooves 9a and 10a, the air flow is cut off and the vacuum can be sensed by switches connected to the small vents 13 and 14 which are joined to the grooves 9a and 10a, respectively.

With the tape 103 against the vacuum walls 9 and 10, the air bearing blocks 17 and 18 are moved into place with a motion parallel to the scanner axis. The vacuum is turned off, the reel motors spool up the excess tape as guides 4 and 5 are swung into operating positions 4a and 5a and function as standard spring loaded compliance arms with optical or magnetic position sensing means to be a part of the servo control of the reel motors of reels 104, 105 to maintain tape tension during recording and reproducing.

The configuration of air bearing blocks 17 and 18 is shown in FIGS. 2a-2f. Air bearing blocks 17 and 18 are similar in overall configuration but positioned differently for tape path management. As shown, block 17 includes upper and lower surfaces 106 and 107 and side surfaces 108, 109, 25, 26, 110. Side surfaces 25, 26, 110 are flat guiding surfaces for magnetic tape 103. Surfaces 108 and 110 join to form a first air bearing radius 111; surfaces 110 and 26 join to form a second air bearing radius 112; surfaces 26 and 25 join to form a third air bearing radius 113; and surfaces 25 and 109 join to form a fourth air bearing radius 114. Air bearing holes 21, 22, 23 and 24 in air bearing block 17 are respectively parallel to air bearing radiuses 114, 113, 112 and 111.

Figure 2B:
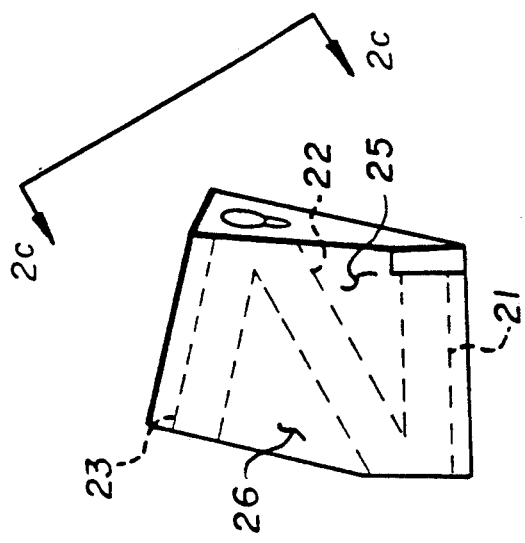
FIGS. 2a-f are respective perspective views of the multi-surface, multi-radius air-bearing blocks of the embodiment of FIG. 1.
Figure 2A:
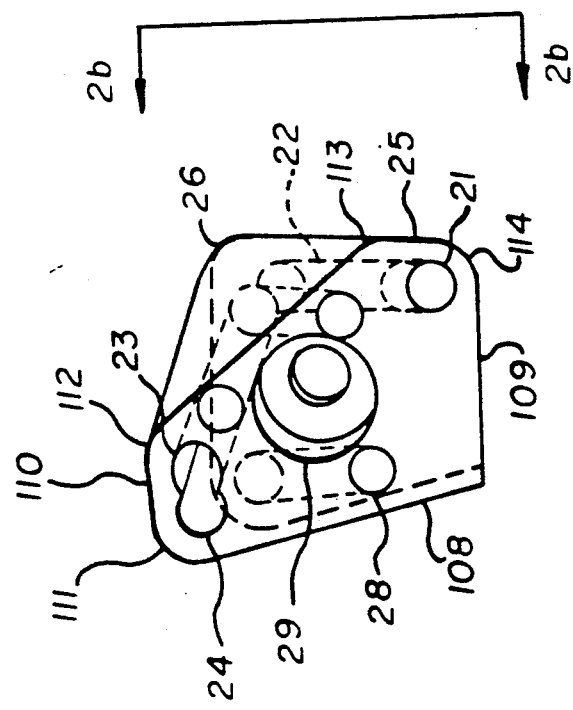
Figure 2D:
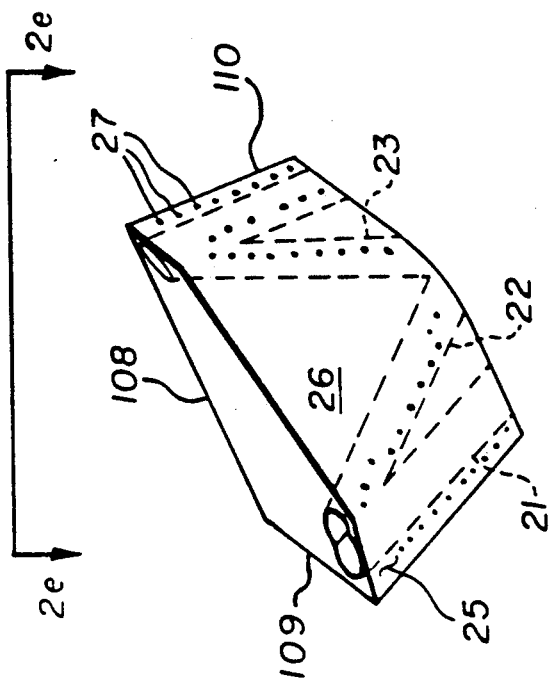
Figure 2C:
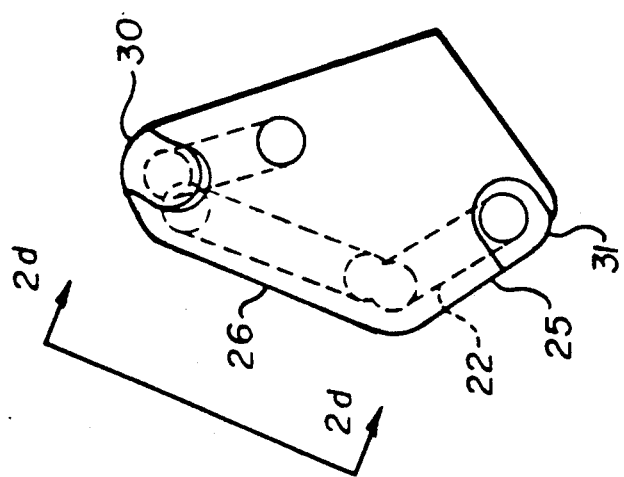
Figure 2F:
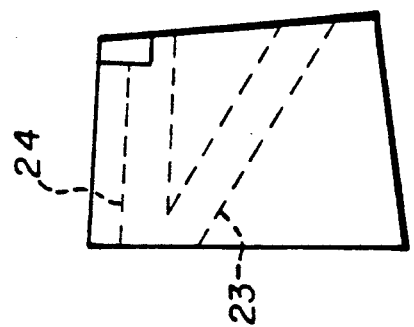
Figure 2E:
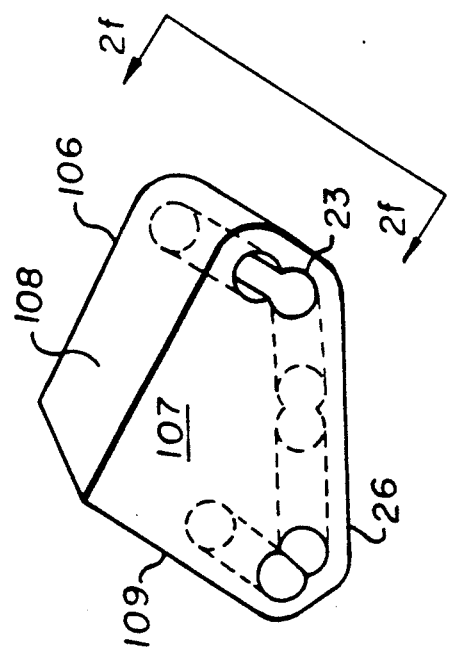

The end coverings on the air venting holes 21 through 24 are omitted for clarity. Holes 21-24 form a continuous air passage. In FIG. 2b, holes 21 and 22 are seen to join; in FIG. 2d, holes 22 and 23 are seen to join; and in FIG. 2f holes 23 and 24 are seen to join. Thus, air pressure supplied to one air venting hole is supplied to all air venting holes. As an example, FIG. 2c shows hole 22 in an axial view and its center line is the center line of the radius 113 of the curved surface tangent to flat surfaces 25 and 26. In a similar way, the other vent holes are at the center of a curved surface that tangentially joins two adjacent flat surfaces. Just inside these tangent lines are vent holes on the curved surface of about 0.008" diameter as illustrated by the dots 27. This bleeds out enough air under pressure to support the tape on a thin film of air on the radiuses of the blocks.

There are three balls 28 embedded in the surface of the block 17. Balls 28 are shown located on one surface on block 17 in view 2a; whereas the other block 18 has the three balls 28 on the opposite surface as seen (without the balls) in view 2c. On opposite corners of the air bearing block 17 are recesses 30 and 31 to accommodate ceramic edge guide surfaces for the control of tape tracking. These are mounted in a scanner mounting plate that holds the scanner 15 and the walls 9 and 10 and the special stops to accept the three balls 28 in each air bearing block.

The air bearing blocks 17, 18 are shaped so that in the forward tape direction as shown by the arrow 130 in FIG. 1, tape height and direction are controlled. The tape 103 wraps on the first vertical radius 111 to establish it on the block 17 surface then wraps on the second (fitted) radius 112. This radius 112 starts the tape 103 downward toward the third fitted radius 113. After this the tape 103 is traveling downward and is leaning sideways an amount corresponding to the helix angle on the scanner 15. After going around the fourth, and last, radius 114, the tape 103 is going upward toward its tangent contact with the scanner 15 at the climbing angle and lateral tilt to correspond to the scanner 15 tilt and helix angle. As tape 103 passes the air bearing block 18 on the exit side of the scanner 15, the opposite occurs because block 18 is like block 17 except that it is inverted with the positioning balls on the new bottom. At the midpoint of the passage of tape 103 around the scanner 15, the tape 103 is traveling in the plane of the tape 103 in the cassette 1. All of the tape path except around blocks 17 and 18 and the scanner 15 is in a flat pattern corresponding to the plane of the tape on the reels 104, 105 in the cassette 1.

Referring now to FIGS. 3a, 3b and 3c, there are shown three types of stops for the balls 28 that are embedded in the air bearing blocks 17 and 18 described above. The balls 28 are mounted on blocks 17 and 18. The ball stop 32 shown in FIG. 3a has a conical pocket 120 to locate one ball 28 of a block. The spring 37 allows the stop 32 to be adjusted axially by a set screw inserted into the threaded insert 38, which, along with the stop 32, fits into a hole in the scanner 15 support plate. In a similar manner, the flat top stop 33 shown in FIG. 3b can be adjusted axially by virtue of its spring 37 and the screw in the threaded insert. The third ball stop 34, shown in FIG. 3c, has a "V" shape to seat the ball. By arranging the "V" by means of the pin 35 (FIG. 3d) and groove 36, the angular orientation of the blocks 17 and 18 is controlled. The pin 35 is positioned in alignment with conical ball stop 32. Thus, stop 32 controls the location of the air bearing block 17,18; stop 34 controls the angular orientation thereof; and stop 33 controls the planar tilt of the plane defined by the three balls 28.

Figure 4:
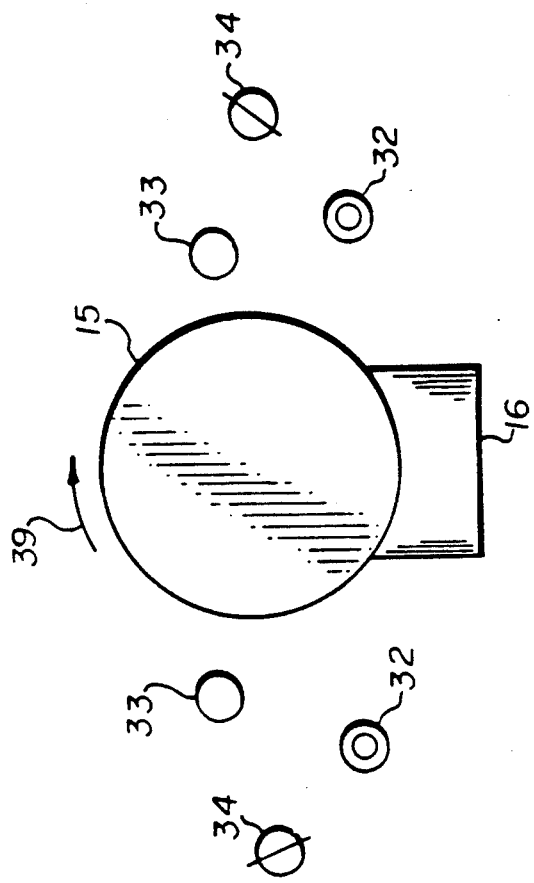
FIG. 4 is a diagrammatic view useful in illustrating the functioning of the ball stop assembly of FIGS. 3a-d.

The arrangement of the three stops 32, 33, 34 on each side of the scanner 15 is as shown in FIG. 4 with the types 32, 33 and 34 positioned as shown. With tape 103 going in the forward direction indicated by the arrow 39, lowering ball stop 34 on the entrance side to scanner 15 will tend to raise the tape 103 going onto the scanner 15. Raising the stop 34 will tend to lower the tape 103 going onto the scanner 15. The ceramic guides located at positions 30 and 31 below the air bearing guide (FIG. 2c) governs tape 103 position. The ball stop 32, 33, 34 adjustments are used to bring the tape 103 into contact with the ceramic guides 30, 31 and aim adjust its direction of travel.

Figure 5:
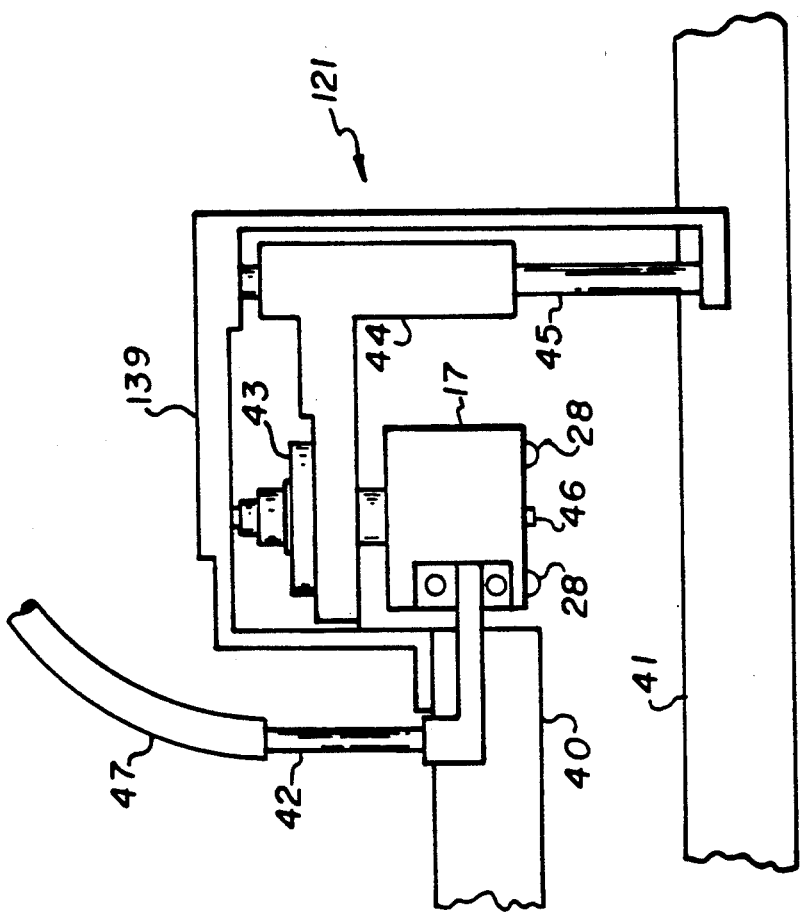
FIG. 5 is a side sectional view of an elevator mechanism for moving the air bearing blocks of the embodiment of FIG. 1.

The elevator 121 shown in FIG. 5 carries the air bearing block 17 (or 18) into or out of the tape 103 path by moving it in an axial direction parallel to the scanner 15. The elevator 121 includes a motor 43, the rotor of which is a nut with an internal helical thread which travels axially on the lead screw 46 which is axially and rotationally constrained. An outrigger sliding bearing 44 rides on a fixed shaft 45 to allow axial motion of the motor 43 but prevent rotation of the motor stator. The stator is fixed to the frame carrying the bearing 44 and to the air bearing block 17. The elevator frame 139 is fastened to upper frame 40 and lower frame 41 with the space between frames 40 and 41 defining the plane of most of the tape path. The air tube 42 carries air under pressure from flexible hose 47 to the air bearing tape block 17. The balls 28 position the air bearing block 17 which is flexibly attached to the moving stator of motor 43.

Figure 6:
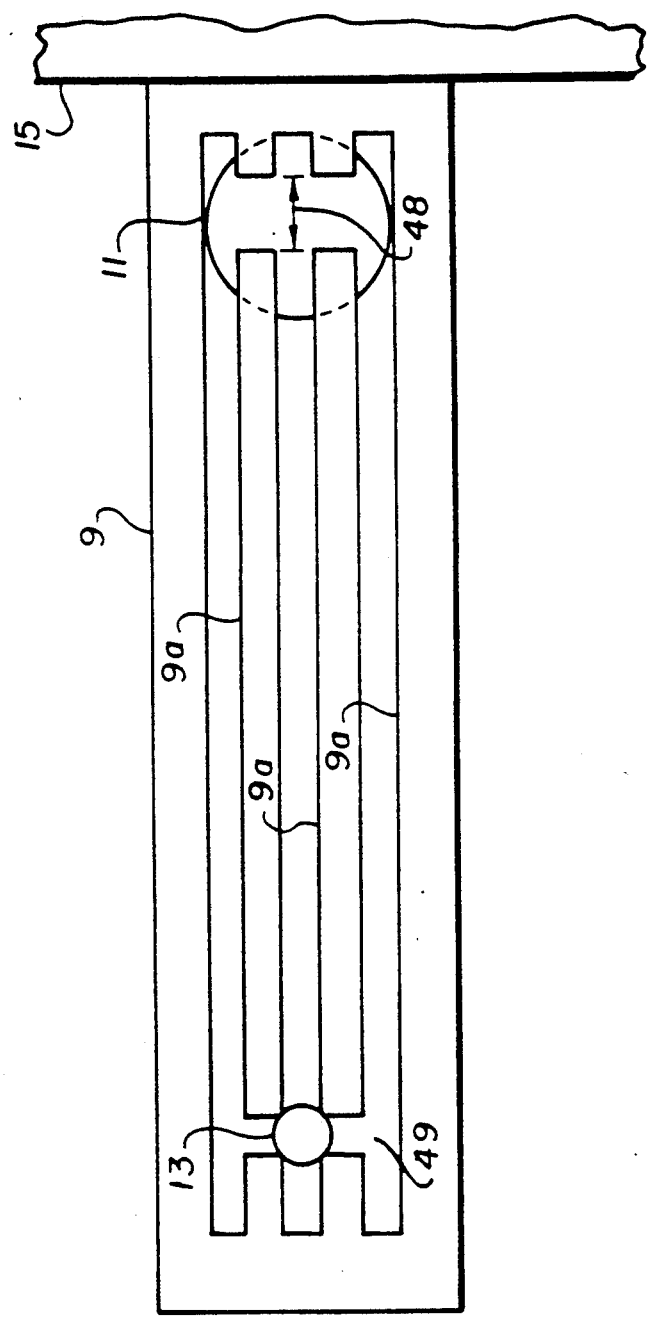
FIG. 6 is an elevational view of a component of the threading assembly of FIG. 1.

Reference is made now to FIG. 1. On the left side, as an example, the air flow into vacuum outlet pipe 11 draws the tape around the scanner 15 and into contact with wall 9 with grooves 9a. The wall is shown in FIG. 6 unrolled for clarity.

The three grooves 9a are joined at the vacuum juncture 11 with the opening 48 for maximum air flow. They are joined together at the sensor opening 13 by a cross groove 49. This is true whether these are two or three grooves 9a as shown. Because the grooves are cross-vented to each other, the vacuum at the juncture 11 will not be sensed at the opening 13 unless the tape is against the whole length of the fence (or wall) 9 to close off the open face of all the grooves. The elevator 121 will not be activated unless the switch connected by tubing to opening 13 is actuated. This prevents damage to the tape 103 by movement of blocks 17, 18 into tape guiding position. Otherwise, the tape 103 will be drawn away from the wall 9 and the tape load or unload cycle restarted. This is a more reliable method than the optical sensing because the tape 103 must be in contact with the entire wall length for the switch to be actuated.

The air bearing blocks 17 and 18 (FIG. 2a–2f) may be made by taking a smooth strip of sheet metal or similar material and bending it elastically so that it takes the natural form that the tape will take laid onto it with no differential stretching across its width. This metal strip may be pre-drilled or post-drilled to function as an air bearing with the back side (inner surface) enclosed with an airtight cavity to form an air source fed from a pump or other available air supply. If the ends of the metal strip are restrained in the positions desired for the tape tangent to the scanner at one end, and to form the end of the flat tape transport tape path at the other end, the metal strip will take the shape of one of many slightly varied, but acceptable, tape paths over the air bearing.

The elevator 121 (FIG. 5) may be actuated by a pneumatic piston in place of the screw drive illustrated. In such case, the piston may be driven against a return spring to afford two way travel or it can be driven by air pressure on either side of the piston alternately to afford two way travel. If the piston is driven by air bearing air pressure and returned by a spring, then it will be automatically positioned when the air bearings are supplied with air and retracted when the air bearings are off.

The vacuum wall shown in FIG. 6 can be as shown with grooves; it can also be formed of perforated metal with a back enclosure. In such case, the tape will roll along the perforated metal band as it rolls along the grooved wall and thereby close all the perforations in sequence just as it closes the open grooves. When the tape has completely closed all of the exposed perforations the vacuum will effect a termination of that phase of the load cycle by actuating a vacuum switch connected to the outer end of the loading wall. This is true for each vacuum wall.

What is claimed is:

1. A magnetic tape cassette helical scan recorder comprising:
    a tilted rotary head scanner;
    means for receiving a magnetic tape cassette containing magnetic tape, said receiving means being spaced from said rotary head scanner;
    a vacuum enclosure contiguous to said rotary head scanner and including curved vacuum walls respectively on either side of said rotary head scanner;
    wherein each of said vacuum walls, includes (1) a first end contiguous to said rotary head scanner and a second end spaced from said rotary head scanner; (2) a plurality of longitudinal vacuum grooves extending between said first and second ends; (3) a first cross groove joining said plurality of longitudinal grooves located in the region of said first end;

(4) a second cross groove joining said plurality of longitudinal grooves located in the region of said second end; (5) a vacuum outlet directly communicating with said first cross groove; and (6) a air pressure sensor directly communicating with said second cross groove;

means for applying a vacuum to said vacuum outlets of said vacuum walls to assist in threading tape from said magnetic tape cassette around said rotary head scanner and into contact with said vacuum walls such that tape contacts said walls at said first ends and progressively covers said walls until said second end is covered and said pressure sensor senses said covering;

respective multi-surface, multi-radius air bearing blocks located on either side of said rotary head scanner and spaced from said respective vacuum walls;

elevator means for moving said air bearing blocks between a first position removed from said vacuum enclosure during tape threading and a second tape guiding position contiguous to said rotary head scanner after said tape threading operation is complete as sensed by said pressure sensor wherein said elevator means is not activated unless said air pressure sensor directly communicating with said second cross groove is actuated by magnetic tape completely closing off said first cross groove, said longitudinal grooves between said first cross groove and said second cross groove; and means for removing said vacuum from said vacuum walls after said air bearing blocks are moved to said second position contiguous to said rotary head scanner and for tensioning said tape about said air bearing blocks which establish a gentle helical path about said rotary head scanner.

2. The recorder of claim 1 wherein each of said air bearing blocks includes upper and lower surfaces, and further includes first, second, third, fourth and fifth planar side surfaces; first, second, third and fourth air bearing radii respectively connecting said first and second side surfaces, said second and third side surfaces, said third and fourth side surfaces and said fourth and fifth side surfaces; first, second, third and fourth air bearing holes within said block, wherein said first, second, third and fourth air bearing holes are connected together to form a continuous passage, and are respectively parallel to said first, second, third and fourth air bearing radii; a plurality of vent holes respectively connecting said air bearing holes to said air bearing radii to supply air under pressure to said radii to support said magnetic tape on a thin film of air as it passes over said radii, such that said second, third and fourth side surfaces and said first, second, third and fourth air bearing guides of each of said air bearing blocks are angled to change the direction of said tape from and to a received magnetic tape cassette to be guided around said tilted rotary head scanner in a helical path.

* * * * *